United States Patent [19]

van der Waal

[11] Patent Number: 4,866,466

[45] Date of Patent: Sep. 12, 1989

[54] METHOD OF PRODUCING A COLOR PICTURE TUBE SCREEN

[75] Inventor: Jan van der Waal, Eindhoven, Netherlands

[73] Assignee: U.S. Philips Corporation, New York, N.Y.

[21] Appl. No.: 185,565

[22] Filed: Apr. 25, 1988

[30] Foreign Application Priority Data

May 27, 1987 [GB] United Kingdom ................. 8712458

[51] Int. Cl.[4] .......................... G03C 5/00; G03B 41/00

[52] U.S. Cl. .......................................... 354/1; 430/23; 430/24

[58] Field of Search ....................... 354/1; 430/23, 24; 313/472

[56] References Cited

U.S. PATENT DOCUMENTS

| | | | |
|---|---|---|---|
| 3,279,340 | 10/1966 | Ramberg et al. | 354/1 |
| 3,499,372 | 3/1970 | Staunton | 313/472 |
| 3,582,701 | 6/1971 | Zeliotis | 313/472 |
| 3,628,850 | 12/1971 | Yamazaki et al. | 354/1 |
| 3,654,505 | 4/1972 | Davis et al. | 313/472 |
| 3,788,200 | 1/1974 | Yamazaki et al. | 354/1 |
| 3,809,558 | 5/1974 | Yamazaki et al. | 430/24 |
| 4,052,122 | 10/1977 | Yamazaki et al. | 354/1 |
| 4,211,477 | 7/1980 | Ueyama et al. | 354/1 |

FOREIGN PATENT DOCUMENTS 1478388 5/1977 United Kingdom .

*Primary Examiner*—A. A. Mathews
*Attorney, Agent, or Firm*—John C. Fox

[57] ABSTRACT

A method of producing a color picture tube screen particularly for a high definition tube. In producing a high definition screen light from a point source (S) is directed through a segmented lens (18) and a shadow mask (24) onto a layer of photoresist applied to the internal surface of a faceplate panel (12). The segmented lens (18) comprises a rectilinear array of differently inclined facets (F). In order to obtain a substantially uniform illumination of the faceplate panel (12), the segmented lens (18) is wobbled in an oblique direction such that in moving from one extreme position to another, the image of a facet on the panel occupies substantially the previous position of the image of another facet obliquely adjacent the first mentioned facet when at the one extreme position.

9 Claims, 5 Drawing Sheets

METHOD OF PRODUCING A COLOR PICTURE TUBE SCREEN

BACKGROUND OF THE INVENTION

The present invention relates to producing a colour picture tube screen, particularly a high definition screen for use in a Datagraphic Display (DGD) colour picture tube.

A difference between a normal colour television display tube screen and a high definition screen for DGD tubes is that the normal colour television screen comprises triplets of phosphor stripes which luminesce in different colours whereas for a DGD tube the screen normally comprises phosphor dots disposed in apertures of a black light absorbing matrix. The making of screens for both types of tubes involves exposing a photoresist material applied to the internal surface of a faceplate panel to light from a point light source which is projected onto the faceplate panel by means of a lens. The lens is designed so that the angle at which the light impinges on the photoresist corresponds to the trajectory of an electron beam to that point on the screen. In the case of making a colour television screen the lens is a continuous lens whereas a segmented lens comprising a plurality of rectilinearly arranged contiguous facets having slightly different inclinations with respect to each other is frequently used for making high resolution DGD tube screens.

British Patent Specification 1473388 discloses a method of screening a colour television picture tube by exposing a photosensitive material on a support to light emitted from a light source and passed through a segmented lens having a plurality of inclined facets, the junctions between adjacent facets being formed by discontinuous surfaces. In order to avoid an objectionable image pattern being produced due to light scattering at the discontinuous surfaces of the segmented lens, these discontinuous surfaces are masked and the masked lens is reciprocated (or wobbled) in an oblique linear direction of 45 annular degrees to the two orthogonal directions of the discontinuities during exposure of the photosensitive material on the faceplate. Typically the extent of the motion is equivalent to the distance between the centres of two diagonally adjacent lens elements and back. A drawback of such a technique is that unless the inclination of all the facets is the same, the energy distribution on the material applied to the faceplate will not be equal. Consequently the unequal energy distribution manifests itself as light areas interspersed by narrow dark and bright lines in those places where the facet images are separated from each other or partially overlap each other, respectively.

OBJECTS AND SUMMARY OF THE INVENTION

An object of the present invention is to obtain an equal energy distribution over the area of a faceplate panel during the exposure time of a photoresist layer applied to the panel to light from a point source.

According to the present invention there is provided a method of producing a colour picture tube screen, comprising exposing a photosensitive material on a faceplate panel to light emitted by a point light source and passed through a segmented lens, the segmented lens comprising an array of facets, at least two of the facets being inclined at different angles, and simultaneously changing the relative position between the segmented lens and the faceplate panel in a direction oblique to the boundaries of the facets during exposure of the photosensitive material, wherein the extent and direction of changing the relative position between the segmented lens and the faceplate panel is such that in moving from one extreme position to another extreme position, the image of a facet on the support occupies substantially the previous position of the image of another facet obliquely adjacent the first mentioned facet when at the one extreme position.

The present invention is based on the recognition of the fact that when using a segmented lens in a lighthouse to produce a high definition screen for a datagraphic display tube, one must begin by considering the required distribution of the images of the facets of the segmented lens projected onto the photoresist layer to obtain an equal energy distribution from a fixed point source and then determine by calculation where the facets should be located in order to provide this required image distribution. In consequence, unlike the prior art discussed, the present invention is not preoccupied with eliminating the effects of the discontinuities of the segmented lens on the image produced in a photoresist applied to the internal surface of the faceplate.

An advantage of calculating backwards is that the curvature of the internal surface of the faceplate panel is allowed for automatically when, as a starting point for the calculations, it is assumed that the image is correct.

In implementing the method in accordance with the present invention, the changing of the relative position between the segmented lens and the faceplate panel may include a slowly changing component transverse to the oblique direction. This transverse component may be substantially normal to the oblique direction. The extent of movement of this slowly changing transverse component should not exceed an oblique path parallel to said oblique direction and passing through corresponding points of the adjacent images.

Optionally, transmission by a preselected area of each facet can be arranged by masking the segmented lens with an optically opaque material. The mask can be applied to the segmented lens or to a substrate on which the lens is provided. Alternatively the mask can comprise a separate member.

The desired image pattern may be a checkerboard pattern in which each element of the pattern is substantially circular and is surrounded by a black light absorbing matrix. The elements are made as large as possible consistent with other operative parameters of the display tube, such as spot size, to ensure the maximum light output from the screen.

BRIEF DESCRIPTION OF THE DRAWING

The present invention will now be explained and described, by way of example, with reference to the accompanying drawings, wherein.

In the drawings, the same reference numerals have been used to indicate corresponding parts.

DESCRIPTION OF THE PREFERRED EMBODIMENTS

Figure 1:
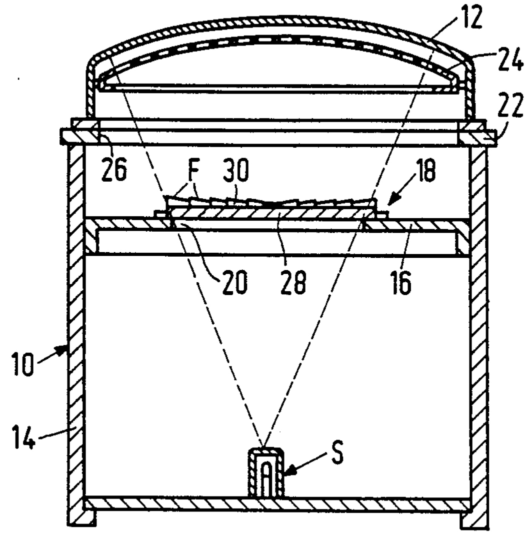
FIG. 1 is a diagrammatic vertical cross-sectional view through a lighthouse.

Referring to FIG. 1, the apparatus (or lighthouse) 10 for exposing a photoresist layer which layer may include a black matrix light absoring material applied to the internal surface of a faceplate panel 12, comprises a housing 14 in the bottom of which a point light source S is provided. A support 16 for a segmented lens 18 is provided intermediate the height of the housing 14. The support 16 has a centrally disposed aperture 20 through which light from the source S passes. A top 22 of the housing carries the faceplate panel 12 with an associated shadow mask 24. The top 22 also has a centrally disposed aperture 26 through which light projected by the lens 18 can pass. The support 16 and/or the top 22 is (or are) capable of movement in orthogonal directions.

Figure 2:
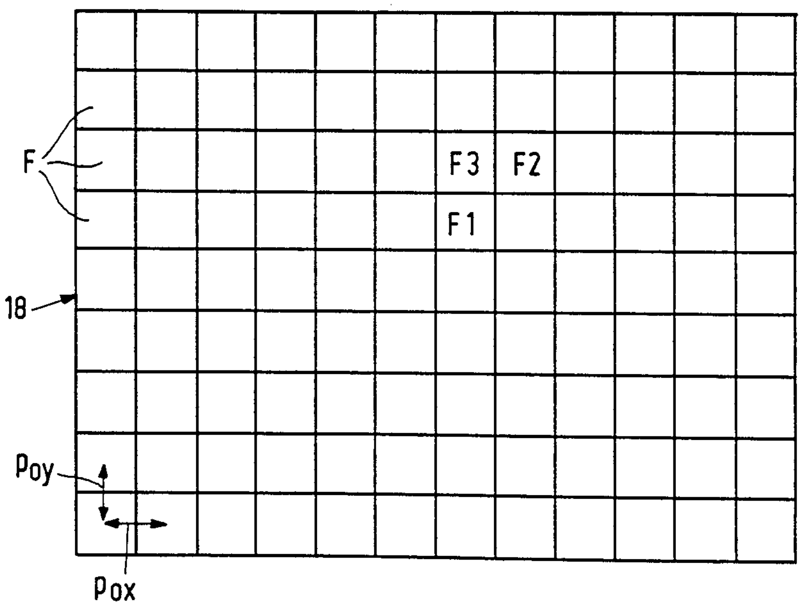
FIG. 2 shows a rectilinear array of lens facets.

FIG. 2 shows the segmented lens 18 and illustrates the two-dimensional rectilinear array of facets F having pitches in the x- and y-directions denoted by $P_{ox}$ and $P_{oy}$. The illustrated embodiment of the segmented lens comprises a flat glass substrate 28 which carries a thin layer 30 of an optically transparent synthetic material in which the facets F are formed, this is shown more clearly in FIG. 1. A segmented lens is used so that light rays from a point source are refracted along paths which coincide with a deflected electron beam incident at a particular point on the screen.

Figure 3:
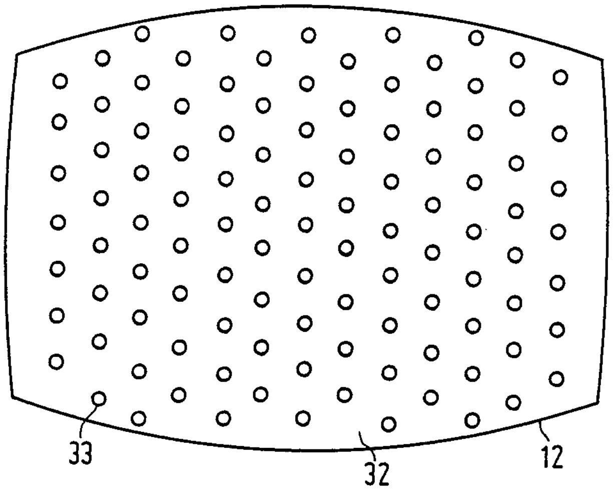
FIG. 3 shows, not to scale, an example of a black matrix on a faceplate panel.

After exposure of the photoresist layer through the segmented lens 18 and the shadow mask 24 and subsequent development of the photoresist, the result is a symmetrical black matrix 32 (FIG. 3) on the faceplate panel 12. Later operations using the apparatus 10 will lead to one or more phosphors being deposited in respective apertures 33 in the black matrix 32.

Figure 4:
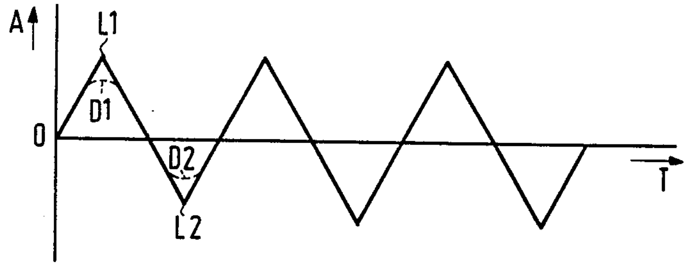
FIG. 4 is an amplitude, A, versus time, T, diagram illustrating the wobbling motion.

In order to obtain a good black matrix 32 the illumination of the photoresist should be substatially constant. However the discontinuities of the segmented lens make this impossible and in order to mitigate this problem it is necessary to wobble the segmented lens. However because the facets F have different angles relative to each other, wobbling the lens in an arbitrary oblique direction is not sufficient to obtain an even illumination and thereby a good black matrix. In accordance with the present invention one determines a wobbling direction and the extent of movement of the lens 18 and/or the faceplate panel in order to produce the desired result at the faceplate panel 12. In order to obtain an equal energy distribution over the faceplate panel during the exposure time of the photoresist layer to light from the source S and simultaneously to avoid possible problems relating to discontinuities of the lens facets F, the primary wobbling direction is oblique to the x- and y-axes and the extent of movement in the oblique direction is such that at the limit of its displacement the image $F'_1$ of a lens facet $F_1$ overlies substantially exactly the image $F'_2$ of the diagonally adjacent lens facet $F_2$ at the commencement or other limit of the wobbling movement. The wobbling movement is illustrated in FIG. 4. It comprises a plurality of cycles, say between 10 and 15 complete cycles, takes place during the exposure period when a shutter (not shown) of the light source S is open. Each cycle should be a step-like movement with a rectilinear movement at a substantially constant velocity between one limit L1 and the other limit L2 with a minimum dwell time at each of the limit positions. Preferably the stopping of the rectilinear motion at the end of the exposure time should be at the same place and in the same phase of movement to avoid the risk of bright and dark narrow lines being formed. If the dwell times at the limits were not minimal but relatively long as indicated by curved broken lines D1 and D2 then an unequal energy distribution would result. Optionally the oblique movement may include an additional, slow component of movement transverse, for example perpendicular, to the original direction of movement.

In order to facilitate an understanding of the present invention reference is made to FIGS. 5 to 11. For convenience of description and illustration the shadow mask 24 (FIG. 1) has been omitted. Also the faceplate panel 12 will be assumed to be flat rather than curved which is permissable because in implementing the method in accordance with the present invention one extrapolates backwards from the faceplate panel 12.

Figure 5:
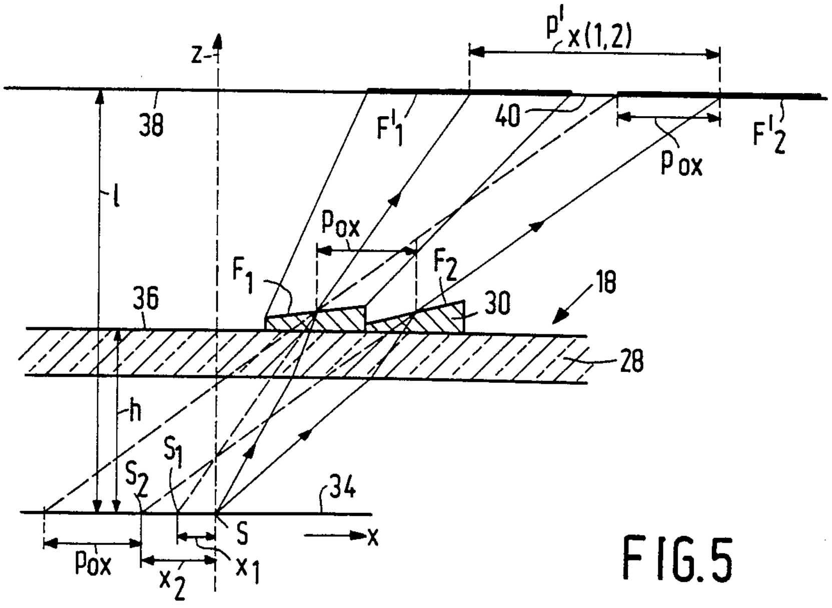
FIG. 5 is a diagrammatic view of the projection of light on to a static faceplate panel by way of a static segmented lens.
Figure 6:
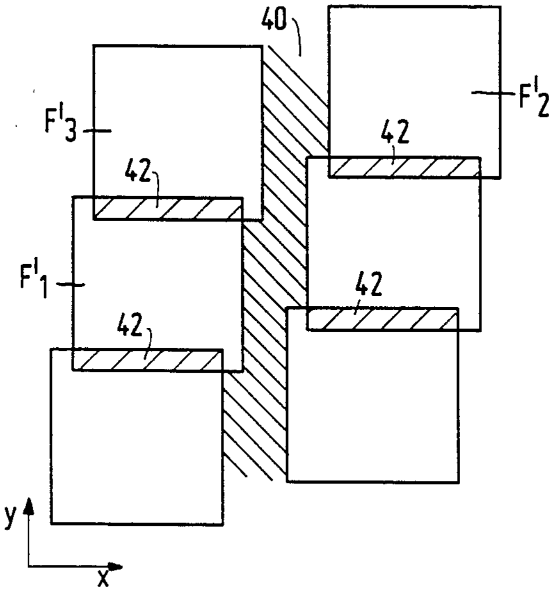
FIG. 6 illustrates the facet images which are so positioned that dark and light areas are produced.

In FIG. 5 the light source plane, the lens plane and the screen plane are denoted by the reference numbers 34, 36 and 38, respectively. The distances between the planes 34 and 36 and the planes 36 and 38 are indicated as h and l, respectively. The point light source S will be assumed to be located at the origin or the point where $x=y=z=0$.

If the segmented lens 18 is static then the light rays from the source S are refracted differently by diagonally adjacent facets $F_1$ and $F_2$ and in consequence their images $F'_1$ and $F'_2$ in the screen plane 38 are separated causing a dark line 40. Alternatively if the marginal portions of two images overlap then a bright line 42 is produced—see FIG. 6.

Referring to FIG. 5, extrapolating the light rays passing forward from the centres of the facets $F_1$ and $F_2$, backwards to the lamp plane 34, the positions of the virtual light sources $S_1$ and $S_2$, respectively, are geometrically separate and neither coincides with the light source S. The distances from the light source S to the virtual light sources $S_1$ and $S_2$ are referenced $x_1$ and $x_2$, respectively.

By means of similar triangles it can be shown that $$\frac{P'_x(1,2) - P_{ox}}{(x_1 - x_2) + P_{ox}} = \frac{1-h}{h} \qquad (1)$$

where $p'_x(1,2)$ is the distance between the centres of the images $F'_1$ and $F'_2$.

Equation (1) can be rewritten:

$$P'_x(1,2) = MP_{ox} + (M-1)(x_1 - x_2) \text{ where } M = 1/h \qquad (2)$$

In the YZ plane (not shown):

$$P_y(1,2)=MP_{oy}+(M-1)(y_1-y_2) \quad (3)$$

Figure 7:
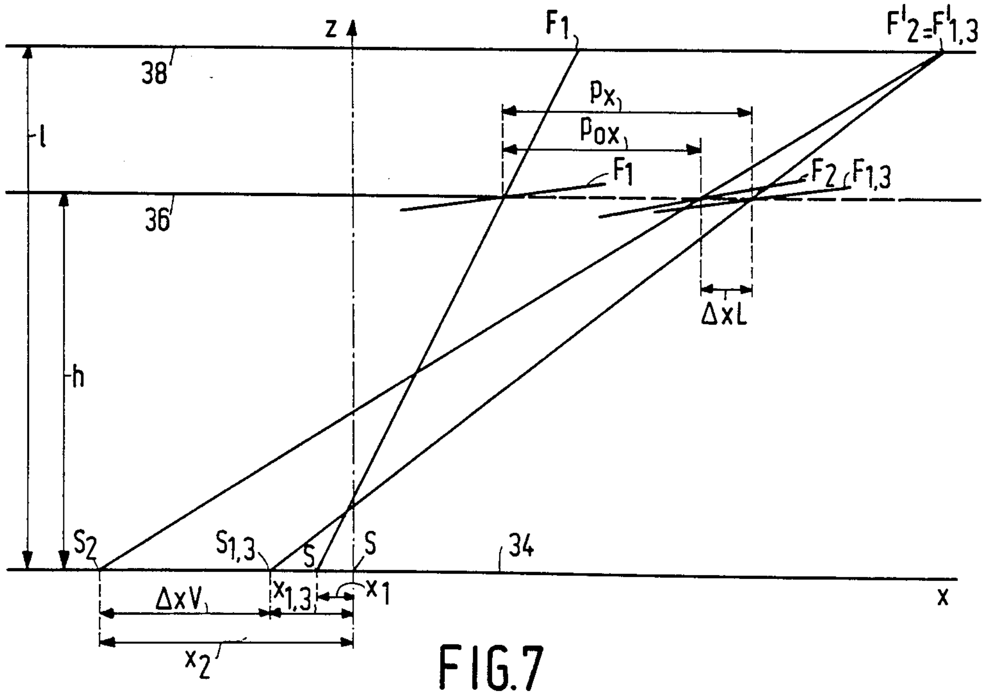
FIG. 7 illustrates the geometrical considerations involved when implementing the method in accordance with the present invention, FIG. 8 and FIG. 9 respectively relate to the displacement of a lens facet and its image at the screen (or faceplate panel)
Figure 8:
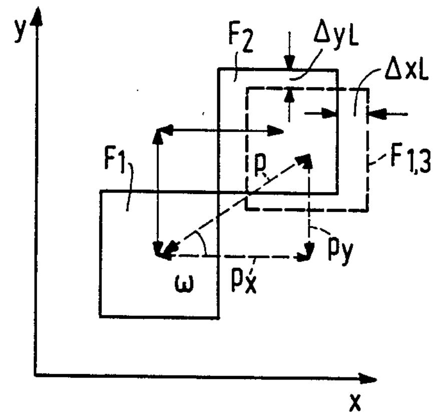
Figure 9:
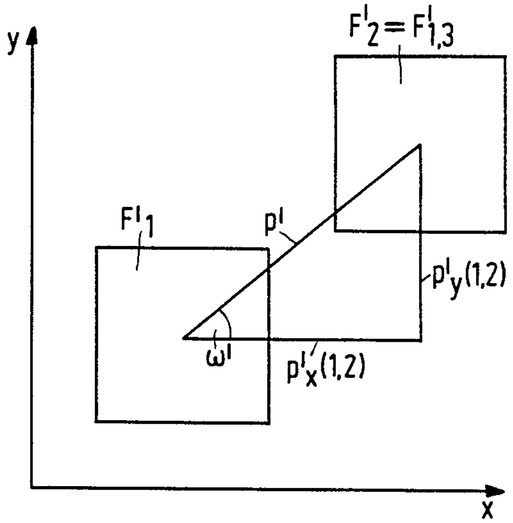

Referring now to FIGS. 7, 8 and 9, a method of determining the optimum wobble of the segmented lens 18 is as follows: The lens facet $F_1$ has to be moved to such an extent and in such a direction that its image $F'_{1,3}$ coincides with the original position of the image $F'_2$ of the lens facet $F_2$. As indicated in FIGS. 7 and 8 the position of the lens facet $F_{1,3}$ does not coincide with lens facet $F_2$. The lens facet position $F_{1,3}$ is displaced by $\Delta xL$ in the x-direction and by $\Delta yL$ in the y-direction relative to the lens facet position $F_2$. The position of the virtual light source $S_{1,3}$ is displaced by $\Delta xV$ and $\Delta yV$ (not shown) in the x- and y-directions relative to virtual light source $S_2$. Thus by similar triangles:

$$\frac{\Delta xL}{\Delta xV}=\frac{\Delta yL}{\Delta yV}=\frac{1-h}{1}=1-\frac{1}{M} \quad (4)$$

The extent of the wobble, P, can be calculated in that $$P=\sqrt{P_x^2+P_y^2} \quad (5)$$

where $$P_x=P_{ox}+\Delta xL \quad (6)$$

and $$P_y=P_{oy}+\Delta yL \quad (7)$$

and the direction of the wobble, w, with reference to the x plane is w=arc tan $$\frac{P_y}{P_x} \quad (8)$$

If the facets $F_1$ and $F_2$ were square with $P_{ox}=P_{oy}=P_o$ and had the same inclination then $\Delta xL$ and $\Delta yL$ would be zero and w=45° and $P=P_oV2$. However in practice the facets have different inclinations so that $\Delta xL$ and $\Delta yL$ have finite values.

The optimum wobble differs for segmented lenses having different sets of facets. However because the segmented lens 18 is an integral structure, the optimum wobble direction and extent is taken either as the average of the values of $P_x$, $P_y$ and w for all the facets or is determined as the average of the values of $P_x$, $P_y$ and w for the more critical positions.

For certain applications a segmented lens could be designed in which for each set of facets and $$\Delta xL=\left(\frac{1-h}{1}\right).\ \Delta xV=\text{constant}$$

$$\Delta yL=\left(\frac{1-h}{1}\right).\ \Delta yV=\text{constant}$$

Also $P_x=P_{ox}+\Delta xL$=constant and $P_y=P_{oy}+\Delta yL$=constant.

However in a situation where such equations cannot be applied it is necessary to consider each facet in turn and assume that its image is displaced obliquely at the screen plane 38 by a distance P' (FIG. 9). Beginning by assuming that the segmented lens is at one limit of its displacement then one calculates the positions of all the virtual light sources $S_1$, $S_2$ and so on which produce the images $F'_1$, $F'_2$ and so on and their distances $x_1$, $y_1$, $x_2$, $y_2$ and so on from the origin, that is the source S. Then one calculates the positions of the virtual light source e.g. $S_{1,3}$, in respect of the segmented lens 18 having been displaced to its other limit in which for example the image $F'_{1,3}$ of the facet $F_1$ overlies the previous image $F'_2$. For convenience only the ray passing through the centre of each facet is considered. From these new calculations one can determine the distances $x_{1,3}$, $y_{1,3}$, $\Delta xV$ and $\Delta yV$ and from these values $\Delta xL$ and $\Delta yL$ can be calculated from equation (4), l and h being known. $P_x$ and $P_y$ can be calculated using equations (6) and (7), the pitches $P_{ox}$ and $P_{oy}$ being known. From this information P and w can be calculated using equations (5) and (8), respectively. Averaging the values of P and w will give the extent and direction of displacement of the segmented lens to give a substantially equal energy distribution over the photoresist layer during the exposure period. Thus by knowing the specification of the faceplate it is possible to determine the wobble direction and extent.

In a refinement of this method which can optimise the wobble direction and extent further, predetermined areas of the facets are masked using an optically opaque material to reduce the range of angles of incidence of the light rays at the screen. In determining the positioning and extent of the masking one endeavours to use only those parts of the facets which have the same wobbling requirements. The masking may be applied to the flat glass substrate 28 or to the layer of synthetic material 30. The apertures in the mask may be square or rectangular. For convenience of description the mask will be referred to as a raster and the apertures as raster openings. The mask material may be of chromium.

Figure 10:
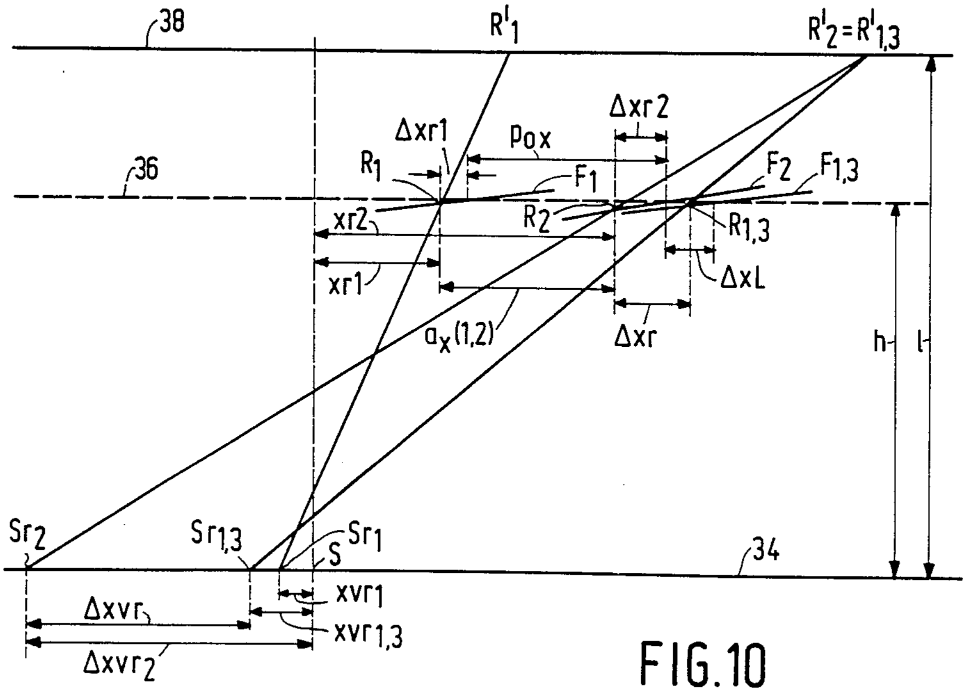
FIG. 10 illustrates the geometrical considerations involved when applying a mask in the form of a raster to the facets of the segmented lens.

FIG. 10 relates to a segmented lens having an optically opaque raster provided on the facets F1 and F2. The raster openings $R_1$ and $R_2$ on these facets have their centres at xr1, yr1 and xr2, yr2, respectively. The images of the central rays passing through the raster openings $R_1$ and $R_2$ are denoted by $R'_1$ and $R'_2$. The virtual light sources Sr1 and Sr2 associated with the respective raster openings R1 and R2 have the coordinates ($xvr_1$, $yvr_1$) and ($xvr_2$, $yvr_2$). The locations of the raster openings on the segmented lens are such that when wobbling the lens over a distance $P_x=P_{ox}+\Delta xL$ and $P_y=P_{oy}+\Delta yL$, the raster opening $R_1$ reaches the position $R_{1,3}$ so that the image $R'_{1,3}$ is now at the position of $R'_2$. The virtual light source of the centre of $R_{1,3}$ is located at ($xvr_{1,3}$, $yvr_{1,3}$). With respect to the original position of raster opening $R_2$, the distance of $R_{1,3}$ in the x-direction is equal to $\Delta xr$ and in the y-direction is equal to $\Delta yr$. It follows by similar triangles that $$\frac{\Delta xr}{\Delta xvr}=\frac{1-h}{1}=1-\frac{1}{M} \quad (9)$$

A similar equation can be derived for the y-direction by replacing x with y.

The above equation (9) is similar to equation (4) except that it is concerned with the centres of the raster openings rather than the centres of the facets.

From FIG. 10 it can be deduced that $$\Delta xr=P_{ox}+\Delta xL+xr_1-xr_2 \quad (10)$$

If the raster openings are symmetrically disposed with reference to the facets then $xr_2-xr_1=P_{ox}$ and $\Delta xr=\Delta xL$.

If it is assumed that for a given segmented lens the average optimum wobble sweep in the x-direction, $P_{xo}$, is $$P_{ox}=P_{ox}+\Delta xL \quad (11)$$

then it follows from equations (9), (10) and (11) that $$\frac{P_{xo}-(xr_2-xr_1)}{xvr_{1,3}-xvr_2}=\frac{1-h}{1} \quad (12)$$

If the position of raster opening $R_1$ with respect to facet $F_1$ is known, then by means of equation (12) the position of $R_2$ can be determined at $F_2$. In order to do this a value for $xr_2$ must be found with the associated value for $xvr_2$ which satisfies equation (12). As a general rule the raster opening will be disposed centrally of the central facet of the segmented lens and the calculations are made with reference to this raster opening. For the sake of completeness the distance in the x-direction to the next raster opening, $a_{x(1,2)}$ is calculated using the following equation:

$$a_{x(1,2)}=xr_2-xr_1=P_{xo}-\frac{1-h}{1}(xvr_{1,3}-xvr_2) \quad (13)$$

Thus by performing this calculation for all the facets the complete pattern of raster openings can be determined.

In a special case of the optimum wobble distances $P_{xo}$ and $P_{yo}$ being equal to the pitches $P_{ox}$ and $P_{oy}$ then equation (13) can be rewritten as follows:

$$a_{x(1,2)}=P_{ox}-\frac{1-h}{1}(xvr_{1,2}-xvr_2) \quad (14)$$

$$a_{y(1,2)}=P_{oy}-\frac{1-h}{1}(yvr_{1,2}-yvr_2) \quad (15)$$

$$\text{and } w=\text{arc tg}\frac{P_{oy}}{P_{ox}}$$

Knowing the specification for the segmented lens 18 in advance, then these calculations for the raster can be put in hand before the synthetic material 30 in which the lens facets are formed is applied to the flat glass substrate 28. This provides the option of depositing the opaque raster, such as a chromium raster, onto the glass substrate 28 and then disposing the synthetic material onto the raster material. In determining the size of the raster openings they should be as large as possible in order to obtain a maximum transmission.

Figure 11:
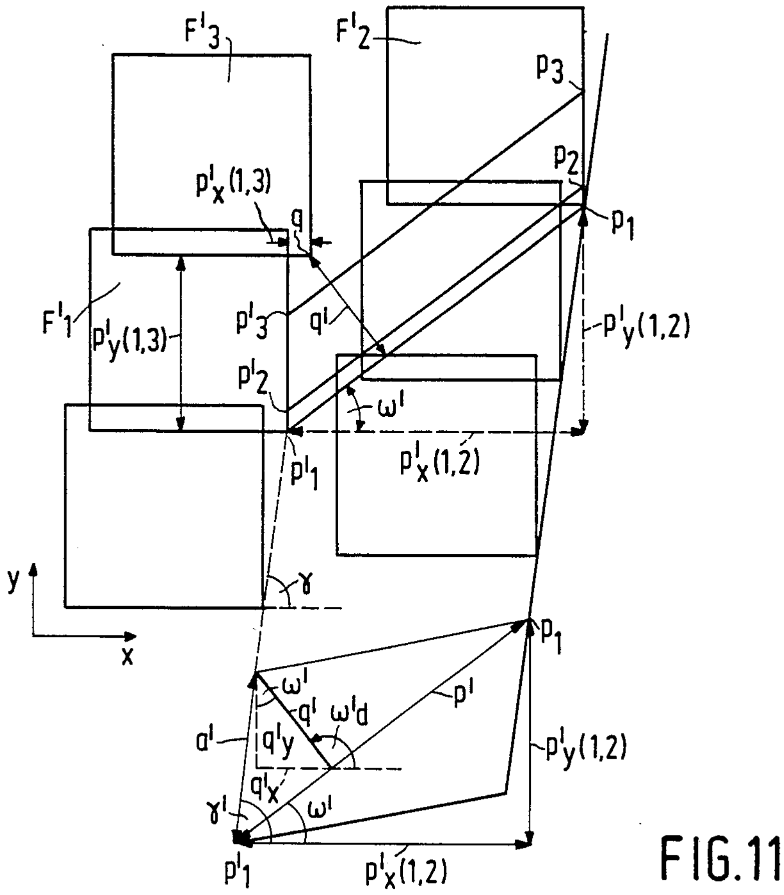
FIG. 11 shows a plurality of facet images and the geometrical considerations which have to be applied when modifying the wobbling movement.

A further refinement in the method in accordance with the present invention can be obtained by modifying the wobbling of the segmented lens 18 (or the faceplate panel 12) by adding a second wobbling component transverse to the direction of the main wobbling motion. Referring to FIG. 11 the necessity for such a refinement is that in translating the image $F'_1$ to the position $F'_2$ certain points of the image pass along paths, for example $P'_1$ to $P_1$ and $P'_3$ to $P_3$, which include the white lines formed by overlapping images, and other poins pass along paths, for example $P'_2$ to $P_2$, which miss these white lines. Hence the distribution of light energy received by the faceplate panel 12 is uneven but the visibility of the dark stripes which are produced is less than that of the horizontal and vertical lines.

These stripes may be prevented by moving the faceplate panel 12 during wobbling (preferably slowly or in steps with the shutter closed) in a direction $w'_d=w'+90°$, where w' is the direction of movement of the images F'1, F'2 etc., over a distance $q'=a'\sin(\gamma-w')$. In this equation $$a'=\sqrt{P'_x(1,3)^2+P'_y(1,3)^2}$$

where $$P'_{x(1,3)}=(M-1)(x_1-x_3)$$

and $$P'_{y(1,3)}=MP_{oy}+(M-1)(y_1-y_3)$$

$$\gamma=\text{arc tg } P'_{y(1,3)}/P'_{x(1,3)}$$

In these equations, $(x_3,y_3)$ are the coordinates of the virtual light source $S_3$ associated with the centre of the lens facet $F_3$.

In the case of modifying the wobbling of the segmented lens by adding a component in a direction $w_d$ over a distance q, where $q'=\sqrt{q^2_x+q^2_y}$ $$\text{with } q_x=q'_{x/M_x}=-\frac{q'\sin w'}{M_x}$$

$$\text{and } q_y=q'_{y/M_y}=-\frac{q'\cos w'}{M_y}$$

consequently $$q=q'\sqrt{\frac{\sin^2 w'}{M_x^2}+\frac{\cos^2 w'}{M_y^2}} \quad (14)$$

It can be shown that $$tg.w_d=\frac{q_y}{q_x}=\left(\frac{M_x}{M_y}\right)^2 tg(w+90°) \quad (15)$$

$$=-\left(\frac{M_x}{M_y}\right)^2 \text{cotg } w$$

$$tg\ w=\left(\frac{M_x}{M_y}\right)tg.w'$$

and that

Generally $M_x \approx M_y \approx M$ so that equation (14) becomes $q \approx q'/M$ also equation (15) simplies to $w_d \approx w+90°$. If $P'_{y(1,3)} >> P'_{x(1,3)}$ then $\approx 90°$ and $a' \approx P'_{y(1,3)}$ Now $$q \approx \frac{q'}{M} \approx \frac{a'\cos w'}{M}$$

$$q \approx \frac{P'_{y(1,3)}\cos w'}{M} \approx \frac{P'_{y(1,2)}\cos w'}{M}$$

$$q \approx P_y \cos w \quad (16)$$

$$P_y = P \sin w \quad (17)$$

From equations (16 and (17) it follows $q \approx \frac{1}{2}P\sin 2w$

If $w \approx 45°$ (in the case of square lens facets) then $q \approx \frac{1}{2}P$ In the case of square facets having comparatively large slopes (2.7°) and differences in slopes, the use of the optimum wobble requirements combined with a movement perpendicular to the wobble direction over a distance q no longer results in facet contours showing.

Figure 12:
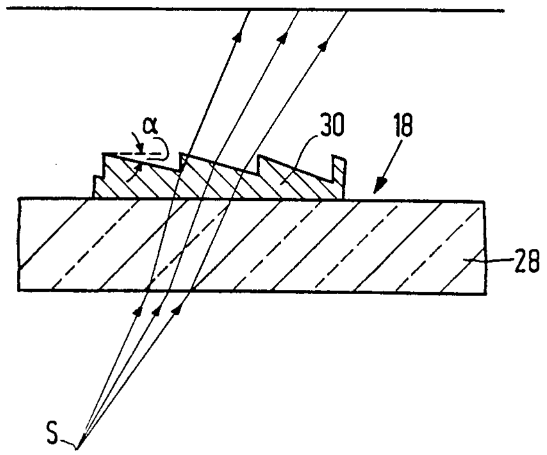
FIG. 12 illustrates the light ray paths for facet angles less than zero.

Up till now the situation with facet angles $\alpha>0$ has been described. If $\alpha>0$ (FIG. 12) only limited parts of the facets are projected to the screen. The centres of these parts of the lens facets and their projection to the screen have to be calculated in order to determine the wobble and drift requirements.

Both $\alpha>0$ and $\alpha>0$ may occur in one lens. Also in that case the centre of the facet areas projected to the screen has to be determined.

What is claimed is:

1. A method of producing a color picture tube screen, comprising exposing a photosensitive material on a faceplate panel to light emitted by a point light source and passed through a segmented lens, the segmented lens comprising an array of facets at least two of the facets being inclined at different angles, and simultaneously changing the relative position between the segmented lens and the faceplate panel in a direction oblique to the boundaries of the facets during exposure of the photosensitive material, wherein the extent and direction of changing the relative position between the segmented lens and the faceplate panel is such that in moving from one extreme position to another extreme position, the image of a facet on the panel occupies substantially the previous position of the image of another facet obliquely adjacent the first mentioned facet when at the one extreme position.

2. A method as claimed in claim 1, wherein the extent and the angular direction of movement is determined by calculating the positions of the facets at the one and the another extreme positions and obtaining mean values for extent and angular direction of movement from these calculated values.

3. A method as claimed in claim 1, wherein selected areas of the facets are masked by an optically opaque material so that light can be transmitted by predetermined portions of the facets.

4. A method as claimed in claim 1, wherein the change in the relative position comprises a rectilinear movement at a substantially constant velocity with substantially instantaneous reversals of direction at the one and the another extreme positions.

5. A method as claimed in of claim 4, wherein during the changing of the relative position between the segmented lens and the faceplate panel, an additional component of movement is provided, which additional component is transverse to said oblique direction.

6. A method as claimed in claim 5, wherein said additional component of movement is substantially normal to said oblique direction.

7. A method as claimed in claim 5, wherein the extent of said additional component of movement corresponds to the translation of the image of a facet by substantially half a diagonal pitch of said images.

8. A method as claimed in claim 5, wherein during the exposure time the additional component of movement is slower than the rate of change in the relative position between the segmented lens and the faceplate panel.

9. A method as claimed in claim 8, wherein during the exposure time one complete cycle of the additional component of movement is executed.

* * * * *